United States Patent [19]

Key, Jr.

[11] 4,203,163
[45] May 13, 1980

[54] TARGET-DETECTION AND LOCATION SYSTEM

[75] Inventor: Carroll L. Key, Jr., State College, Pa.

[73] Assignee: The United States of America as represented by the Secretary of the Navy, Washington, D.C.

[21] Appl. No.: 855,479

[22] Filed: Nov. 25, 1959

[51] Int. Cl.$^2$ .............................................. G01S 3/80
[52] U.S. Cl. ................................... 367/125; 367/126; 114/23
[58] Field of Search ............... 340/3, 6, 16; 114/21.1, 114/23; 343/16.1, 100.12, 100.7; 235/181; 318/18; 328/146, 147; 367/126, 125

[56] References Cited

U.S. PATENT DOCUMENTS 2,948,970  8/1960  Carruthers ...................... 367/126 X Primary Examiner—Richard A. Farley
Attorney, Agent, or Firm—R. S. Sciascia; Henry Hansen

EXEMPLARY CLAIM

6. In a target-detection and location system adaptable for the navigation of an acoustic torpedo, having a first and a second alternating voltage signal emanating from the acoustic detection portion of said torpedo, the combination comprising: a phase-shifter adapted to delay the phase of said incoming first voltage signal 90 degrees; a phase-inverter driven by said phase-shifter the output of said phase-inverter being two voltages, one in-phase with and the other out-of-phase with the signal from said phase-shifter; a potentiometer having a variable arm electrically connected therewith, said potentiometer being connected across the output of said phase-inverter; means for combining the voltage at said variable arm with said second voltage signal; a first and a second limiting amplifier adapted to maintain a constant power output, said second voltage signal and the voltage present at said variable arm being applied to said second limiting amplifier, and said in-phase voltage from said phase-inverter being applied to said first limiting amplifier; a phase-sensitive detector connected to said first and second limiting amplifiers adapted to compare signals of said limiting amplifiers, the polarity of the output signal of said phase-sensitive detector being dependent on the phase-relationship of the output signal of said limiting amplifiers; and a servo motor system operationally associated with said potentiometer arm, the direction of rotation of said motor being controlled by the output of said phase-sensitive detector whereby said potentiometer arm is so oriented as to result in a zero signal input to said limiting amplifier, the orientation of said potentiometer arm being respectively proportional to the magnitude of said second voltage and indicative of its polarity.

12 Claims, 2 Drawing Figures

TARGET-DETECTION AND LOCATION SYSTEM

This invention relates to detection systems and, more particularly, to an acoustic target-detection and direction-finding system.

The use of signal-processing systems to guide acoustic "homing" torpedoes is well known. These systems frequently employ hydrophone arrays in the torpedo to convert acoustic-target signals into electrical signals which are then processed so as to determine the direction of the target, both in the horizontal plane and the vertical plane. The output of such a system is used to control the steering mechanism of a torpedo so that it will proceed towards the target. Should the target attempt evasive tactics, the signal-processing system will note the new target angles and redirect the torpedo along a course so as to intercept and destroy the target. Such systems, which utilize the sound emanating from the target, are known as passive-acoustic homing systems.

The present invention determines the direction and approximate magnitude of the angle between the torpedo axis and the target. By computer methods well known in the art, it is possible to process these data and program the torpedo to steer a "proportional-homing" course which will intercept the target on the first attack without the necessity for re-attack.

It is an object of this invention to provide an improved acoustic-detection and direction-finding system.

It is another object of this invention to provide an improved target-detection and direction-finding system having an output roughly proportional to target angle which may be used to direct a torpedo in a proportional-homing trajectory.

It is a further object of this invention to provide an acoustic-detection system which will operate effectively at signal-to-noise ratios less than 1:1 for large detection ranges.

It is also an object of this invention to provide an acoustic-detection and direction-finding system which requires minimum balancing and calibration.

Other objects of this invention and a fuller understanding may be had by referring to the following description and claims taken in conjunction with the accompanying drawings, in which:

Figure 1:
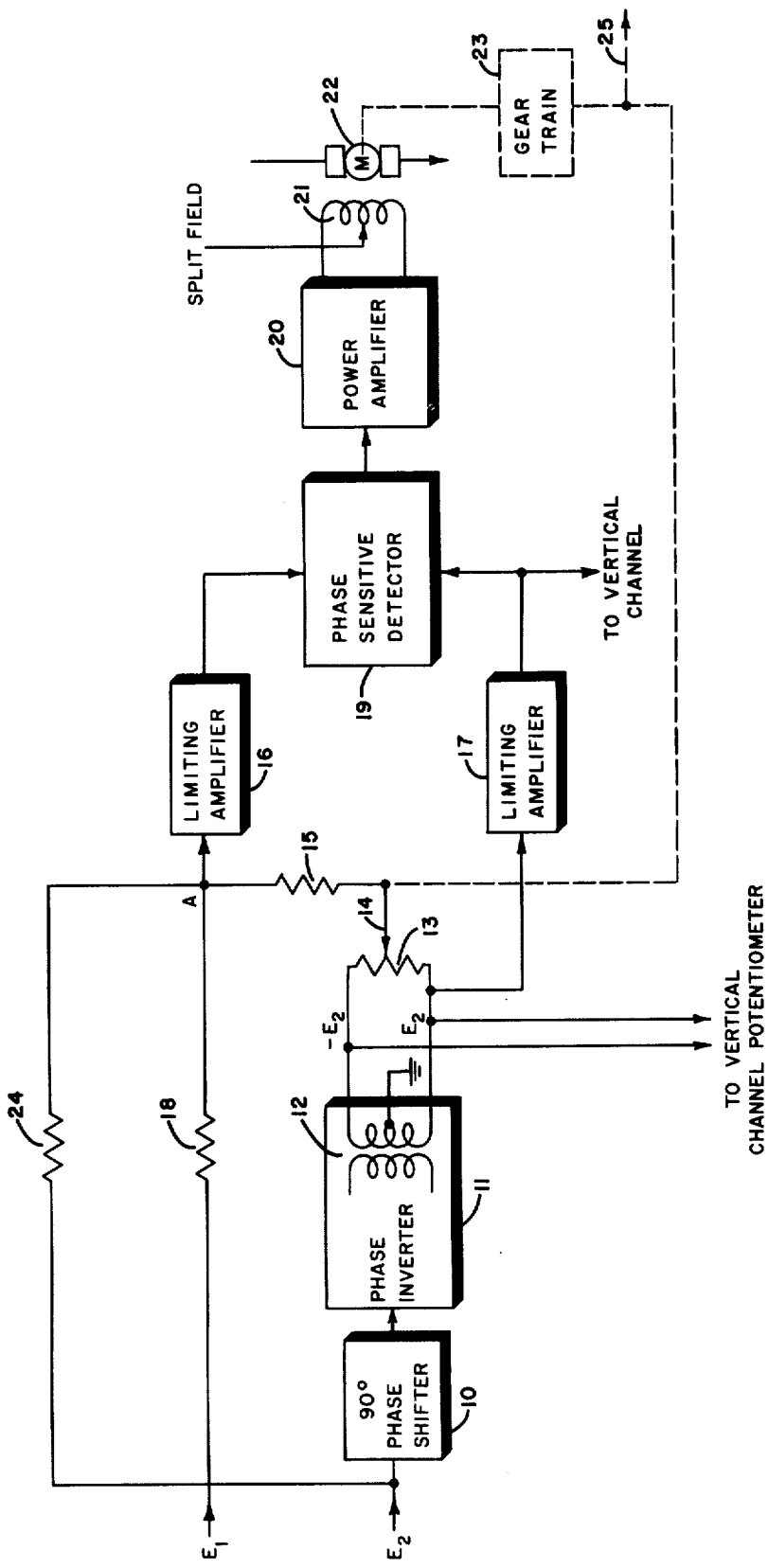
FIG. 1 is a block diagram illustrating the invention in its simplest form.

For simplicity, the device referred to in the drawings and following description is adapted for the processing of horizontal target angle information and/or the steering of the torpedo in a left or right direction. In an operating torpedo, an identical device would control the vertical movement, also.

Referring now to the drawings and in particular to FIG. 1, phase-shifter 10 is of a conventional type capable of delaying the phase of an incoming signal by 90 degrees. This may be accomplished, for example, by a resistance, inductance, capacitance network. Phase-shifter 10 is connected to phase-inverter 11, also of a conventional type capable of producing one voltage in-phase and the other 180 degrees out-of-phase with respect to the original input-signal voltage. Here the 180 degree phase-inversion is produced by a center-tap transformer 12, the center-tap of which is grounded, although electronic type inverters may be used. Phase-shifter 10 and phase-inverter 11 have a combined gain of unity at the frequencies of interest. Linear potentiometer 13 is connected across the output of transformer 12 and is equipped with a potentiometer arm 14 connected through resistor 15 and point A, to conventional high-gain, limiting amplifier 16. A similar conventional high-gain, limiting amplifier 17 is connected to one of the output terminals of phase-inverter 11. Limiting amplifiers 16 and 17 are of the constant power output type, for example, an automatic-gain control or "clipper" device.

Phase-sensitive detector 19 is of a conventional electronic type comprised of, for example, two transformers and diodes suitably arranged to determine if input signals are in-phase or 180 degrees out-of-phase. Phase-sensitive detector 19 is connected to a conventional-power amplifier 20, such as one with a push-pull output. The split-field winding 21 of motor 22 comprises a load for the power amplifier. Motor 22, in turn, controls by mechanical linkage through gear train 23 (shown by the dotted line), the movement of potentiometer arm 14. Taps from the output of phase-inverter 11 (to vertical channel potentiometer) and from the output of limiting amplifier 17 (to vertical channel) proceed to similar vertical channel detection and direction finding equipment in the completed device, thus, allowing detection and steering to proceed in a vertical as well as horizontal plane.

Figure 2:
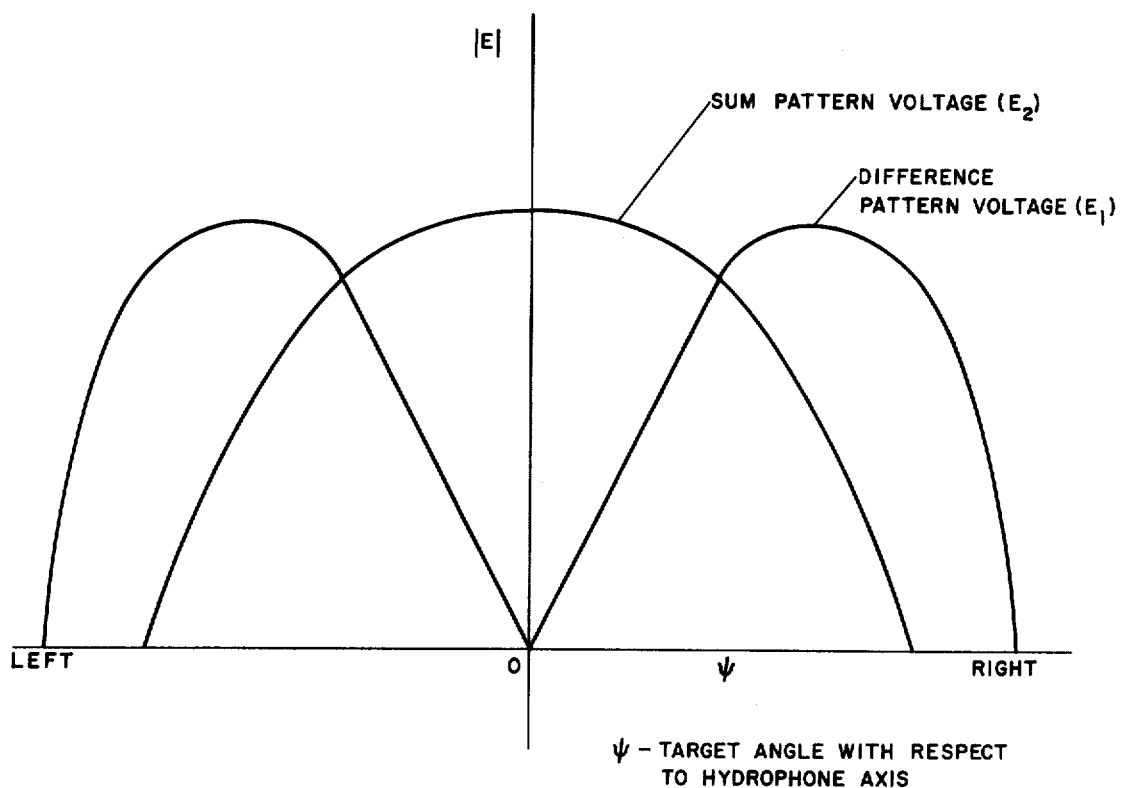
FIG. 2 is a graph of output voltages of acoustic hydrophone transducer-sum pattern and azimuth-difference pattern as a function of target angle.

Referring now to FIG. 2, the sum-signal and difference-signal outputs from the acoustic hydrophone array (not shown), in addition to the amplitude characteristics described, have phase characteristics such that, if the sum-signal is arbitrarily taken to have a reference phase of 90 degrees, right and left target-signals would produce difference-signals of 0 degree and 180 degree phase respectively. This array is comprised of a number of acoustic hydrophone devices capable of detecting target sounds. A voltage derived from current passing through the windings of all array hydrophones in series is designated as sum-signal, $E_2$, while a difference-signal voltage, $E_1$, originates from the respective series windings voltages of hydrophones on the right side of the array electrically subtracted from those on the left, as is known in the art. Reference to a device to produce such sum and difference voltages may be found in U.S. Pat. No. 2,948,970, "Sonar Device" by Carruthers and Kirkpatrick.

In operation, the sum-signal $E_2$, from the hydrophone array (not shown), is phase-delayed 90 degrees by phase-shifter 10 to produce a reference-signal with which the difference-signal $E_1$ has either 0 degree or 180 degree phase relationship. This reference-signal is then fed through the phase-inverter 11. The potentiometer is connected to the phase-inverter output in such a manner that the potentiometer arm 14 can select either 0 ($E_2$) degree or 180 ($-E_2$) degree phase with respect to the reference-signal, and any magnitude from zero up to the magnitude of $E_2$.

The difference-signal $E_1$ from the hydrophone array passes through resistor 18 to point A. Signal from the potentiometer arm 14 pass through resistor 15 and likewise at point A. The resulting signal at point A, comprised of the sum of the two mentioned input signals, passes through limiting amplifier 16 and the reference-signal passes through limiting amplifier 17. These two signals are phase-compared in the phase-sensitive detector 19. The output of phase-sensitive detector 19 is either a positive or negative voltage, depending upon whether its input signals are in 0 degree or 180 degree phase-relationship. This output is then fed into power amplifier 20 which drives the motor 22 clockwise or counter-clockwise, depending upon the polarity of the signal at the output of phase-sensitive detector 19. The output of the motor 22, in turn, controls the position of the potentiometer arm 14 through gear train 23, moving this arm in such a direction as to make the voltage emanating from resistor 15 at point A exactly equal to that from resistor 18 at point A, but different inphase by 180 degrees. Thus, the action of the system is such as to always drive potentiometer arm 14 in the direction to decrease the voltage at point A to zero.

The potentiometer arm 14 is moved towards the particular position which makes the ratio of the signal voltage appearing on the arm, to reference-signal voltage, equal to the ratio of difference-signal voltage $E_1$ to sum-signal voltage $E_2$. Now, with a linear potentiometer, the angle of the shaft 25 driving the potentiometer arm 14, will be proportional to the ratio of difference-signal voltage $E_1$ to sum-voltage $E_2$. Referring again to FIG. 2, it may be seen that for some range of target angles, the ratio of the difference-voltage $E_1$ to the sum-voltage $E_2$ is proportional to the target angle. Thus, the output shaft 25 is constantly driven to a position proportional to target angle. Shaft 25, in turn, is adapted for activating equipment (indicated by the dotted arrow) well known in the art to turn the torpedo rudder (not shown) to the target angle, thus, directing the moving torpedo toward its target.

Variation of the signal-to-noise ratio has the effect of changing the forward-loop gain of this servomechanism, the gain becoming very high when the signal-to-noise ratio (S/N) becomes high. This can cause instability of the servomechanism with resultant oscillations which, because of inherent non-linearities in the system, are limited to small amplitudes and high frequencies. While not necessarily deleterious to the usefulness of the scheme described, the effect is eliminated by inserting unshifted sum-signal $E_2$ through resistor 24 to point A. It may be noted that resistors 15, 18 and 24 form an adding network which performs the function of adding the three signals and presenting the sum at point A. This signal has the effect of limiting the maximum forward-loop gain of the servomechanism as a function of signal-to-noise ratio. The amount of unshifted sum-signal $E_2$ added at point A, as determined by the size of resistor 24, may be set to maintain the servomechanism stable for all signal-to-noise ratios.

Inherent in the operation of the device described is a change of the ratio of indicated target angle $A^*$ to actual target angle A with signal-to-noise ratio in accordance with $$\frac{A^*}{A} \propto \frac{(S/N)^2}{1 + (S/N)^2}.$$

The foregoing description has pertained primarily to the measurement of target angles as applied particularly to guiding a torpedo. The system being described also provides a method of detecting a target. By varying the axis of the hydrophone patterns with respect to a fixed set of earth coordinates and observing the motion of the output shaft 25, the presence of target signals can be detected under conditions of low signal-to-noise ratio. Since the noise present in both pattern outputs is largely incoherent and is normally not affected by changes with respect to a fixed coordinate system, only small random motions of the output shaft are present in the absence of a target-signal. Therefore, motions of the output shaft 25, in excess of these random motions, can be presumed to be due to signals emanating from a target. Then, by simply observing the deviation of output shaft 25 from the central position when the hydrophone patterns axes are being rotated through space, the presence of target-signals can be detected. It has been demonstrated that reliable-target detection can be obtained by this technique for signal-to-noise voltage ratios of less than 0.32.

Equipment parameters, utilized in demonstration, which are not fundamental to the scheme are input bandwidth of 1 $kc_x$ and a servomechanism bandpass of approximately 0.3 cycles per second and 10 cycles per second at signal-to-noise ratios of 0.3 and 10 respectively. Peak hydrophone sensitivites (see FIG. 2) on the difference-patterns were at angles of approximately $\pm 10$ degrees. Angular scan rates used in searching for targets were approximately 10 degrees per second.

Various modifications of the circuit elements herein mentioned may be made without departing from the spirit of this invention. The use of electrical phase-shifter 10, although practical for input bandwidth small with respect to center frequencies, may be replaced by suitable time delay networks in applications where bandwidths are large in comparison with the center frequency used. Motor 22 and its amplifier 20 may be replaced with electronic, hydraulic and pneumatic devices through techniques well known in the art. The potentiometer 13 may be made non-linear to compensate for hydrophone pattern non-linearities. This potentiometer may also be replaced by other motion-to-voltage transducers or by purely electronic devices known in the art.

Although the present invention is described in terms of limiting amplifiers and phase-sensitive detectors, other implementations of non-coherent detection are contemplated, such as, frequency shift by heterodyning techniques or sampling techniques. Although the device operates in terms of sum and difference patterns derived from a unified hydrophone array, other configurations can be used as long as coherence for plane waves obtains, and relative non-coherence of background noises can be assumed. The present invention may be designed to provide for either optimum servo response or other passbands when required for other applications.

Since other varied modifications and equivalence of the invention will occur to those who are skilled in the art, it is intended that the claims that follow shall not be limited by the particular embodiments of the invention that are shown or described herein, but only by the prior art.

I claim:

1. In a device for comparing the ratio of alternating voltages consisting of a first voltage signal and a second voltage signal having identical instantaneous waveform properties, the combination comprising: a phase-shifting means adapted to delay the phase of said incoming first voltage signal; phase-inversion means driven by said phase-shifting means, the output of said phase-inversion means being two voltages, one in-phase with, and the outer out-of-phase with the signal from said phase-shifting means; a potentiometer connected across the output of said phase-inversion means; a variable arm electrically connected across said potentiometer; means for combining the voltage at said variable arm with said second voltage signal; a first and a second limiting amplifier means adapted to maintain a constant power output, said voltage at said variable arm and said second voltage signal being applied to said second limiting amplifier means and said in-phase voltage from said phase-inversion means being applied to said first limiting amplifier means; phase-detection means adapted to compare the output signals of said first and second limiting amplifier means; and servo means operationally associated with said potentiometer arm, the direction of rotation of said servo means being controlled by the output of said phase-sensitive detector means whereby said potentiometer arm is so oriented as to result in a zero signal input to said second limiting amplifier means, the orientation of said potentiometer arm being respectively proportional to the magnitude of said second voltage and indicative of its polarity.

2. The combination as claimed in claim 1 having a phase-inversion means comprised of a transformer, the secondary coil of which is center-tapped to ground.

3. In a device for comparing the ratio of alternating voltages consisting of a first voltage signal and a second voltage signal having identical instantaneous waveform properties, the combination comprising: a phase-shifting means adapted to delay the phase of an incoming first voltage signal 90 degrees; phase-inversion means driven by said phase-shifting means, the output of said phase-inversion means being two voltages, one in-phase with, and the other out-of-phase with the signals from said phase-shifting means; a potentiometer connected across the output of said phase-inversion means; a variable arm electrically connected across said potentiometer; means for combining the voltages at said variable arm with said second voltage signal; a first and a second limiting amplifier means adapted to maintain a constant power output, said second voltage signal and said variable arm voltage signal being applied to said second limiting amplifier means, and said in-phase voltage from said phase-inversion means being applied to said first limiting amplifier means; phase-detection means adapted to compare the output signal of said first and second limiting amplifier means, the polarity of the output signal of said phase-detection means being dependent upon the phase-relationship of the output signal of said limiting amplifier means; and servo means operationally associated with said potentiometer arm, the direction of rotation of said servo means being controlled by the output of said phase-detector means whereby said potentiometer arm is so oriented as to result in a zero-signal input to said second limiting amplifier means, the orientation of said potentiometer arm being respectively proportional to the magnitude of said second voltage and indicative of its polarity.

4. The combination as claimed in claim 3 in which said first and second limiting amplifier means is comprised of automatic-gain control amplifiers.

5. The combination as claimed in claim 4 in which said servo means is comprised of a split-field servo motor, rotable in either direction depending upon the polarity of current through its field coil.

6. In a target-detection and location system adaptable for the navigation of an acoustic torpedo, having a first and a second alternating voltage signal emanating from the acoustic detection portion of said torpedo the combination comprising: a phase-shifter adapted to delay the phase of said incoming first voltage signal 90 degrees; a phase-inverter driven by said phase-shifter the output of said phase-inverter being two voltages, one in-phase with and the other out-of-phase with the signal from said phase-shifter; a potentiometer having a variable arm electrically connected therewith, said potentiometer being connected across the output of said phase-inverter; means for combining the voltage at said variable arm with said second voltage signal; a first and a second limiting amplifier adapted to maintain a constant power output, said second voltage signal and the voltage present at said variable arm being applied to said second limiting amplifier, and said in-phase voltage from said phase-inverter being applied to said first limiting amplifier; a phase-sensitive detector connected to said first and second limiting amplifiers adapted to compare signals of said limiting amplifiers, the polarity of the output signal of said phase-sensitive detector being dependent on the phase-relationship of the output signal of said limiting amplifiers; and a servo motor system operationally associated with said potentiometer arm, the direction of rotation of said motor being controlled by the output of said phase-sensitive detector whereby said potentiometer arm is so oriented as to result in a zero signal input to said limiting amplifier, the orientation of said potentiometer arm being respectively proportional to the magnitude of said second voltage and indicative of its polarity.

7. The combination as claimed in claim 6 in which said means for combining the voltage signals is comprised of resistors.

8. In a target-detection and location system adaptable for the navigation of a naval torpedo having a first and a second alternating voltage signal emanating from the acoustic detection portion of said torpedo, the combination comprising; a phase-shifter adapted to delay the phase of an incoming first voltage signal; a phase-inverter driven by said phase-shifter the output of said phase-inverter being two voltages, one in-phase with and the other out-of-phase with the signal from said phase-shifter; a potentiometer having a variable arm electrically connected therewith, said potentiometer being connected across the output of said phase-inverter; a first and a second limiting amplifier adapted to maintain constant power output, said second voltage signal and the voltage present at said variable arm being applied to said second limiting amplifier, and said in-phase voltage of said phase-inverter being applied to said first limiting amplifier; a phase-sensitive detector connected to and adapted to compare signals from said limiting amplifiers, the polarity of the output signal of said phase-sensitive detector being dependent on the phase-relationship of the output signal of said limiting amplifiers; a power amplifier adapted to receive said output signal of said phase-sensitive detector; a servo motor connected to said potentiometer arm, the direction of rotation of said servo motor being controlled by the output of said power amplifier whereby said potentiometer arm is so oriented as to result in a zero signal input to said second limiting amplifier, the orientation of said potentiometer arm being respectively proportional to the magnitude of said second voltage and indicative of its polarity; and means for combining the voltage signal of said variable arm and said second voltage signal with said first voltage signal whereby the signal-to-noise ratio of the resulting combination of voltages is maintained sufficiently low to allow ready adjustment of said potentiometer arm to maintain a zero input signal to said second phase-sensitive detector.

9. The combination as claimed in claim 8 in which said means for combining the voltage signal of said variable arm and said second voltage signal with said first voltage signal is comprised of resistors.

10. The combination as claimed in claim 9 in which said first voltage signal is comprised of the sum voltages from a magnetostrictive hydrophone array and said second voltage signal is comprised of the difference voltages from said hydrophone array.

11. The combination as claimed in claim 10 in which said first and second limiting amplifiers are comprised of clipping amplifiers adapted to maintain a constant amplitude output signal.

12. The combination as claimed in claim 11 in which said phase-inverter is comprised of a transformer the secondary winding of which is center-tapped to ground.

* * * * *